US010232705B2

United States Patent
Wang et al.

(10) Patent No.: US 10,232,705 B2
(45) Date of Patent: Mar. 19, 2019

(54) DUAL-MOTOR COUPLING DRIVE AXLE WITH TORQUE VECTORING FUNCTION

(71) Applicant: Jilin University, Changchun (CN)

(72) Inventors: Junnian Wang, Changchun (CN); Bin Yang, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 15/959,217

(22) Filed: Apr. 21, 2018

(65) Prior Publication Data

US 2018/0304744 A1    Oct. 25, 2018

(30) Foreign Application Priority Data

Apr. 21, 2017    (CN) .......................... 2017 1 0266046

(51) Int. Cl.
| | |
|---|---|
| B60K 1/02 | (2006.01) |
| B60K 17/02 | (2006.01) |
| B60K 17/16 | (2006.01) |
| B60K 17/04 | (2006.01) |
| B60K 6/445 | (2007.10) |
| B60K 7/00 | (2006.01) |

(52) U.S. Cl.
CPC .............. B60K 17/02 (2013.01); B60K 1/02 (2013.01); B60K 6/445 (2013.01); B60K 17/046 (2013.01); B60K 17/165 (2013.01); B60K 2007/0038 (2013.01); B60L 2240/423 (2013.01); B60L 2240/486 (2013.01)

(58) Field of Classification Search
CPC .............. F16H 48/36; F16H 2048/364; F16H 2048/368; B60K 17/02; B60K 6/445; B60K 17/165; B60K 1/02; B60K 17/046; B60L 2240/423; B60L 2240/486; B60L 2007/0038
See application file for complete search history.

(56) References Cited

U.S. PATENT DOCUMENTS

| | | | |
|---|---|---|---|
| 9,689,485 B1* | 6/2017 | Zhao | F16H 48/36 |
| 9,744,850 B2* | 8/2017 | Nilsson | B60K 1/00 |
| 2005/0252707 A1* | 11/2005 | Bowen | B60K 17/16 180/235 |
| 2006/0122023 A1* | 6/2006 | Bowen | B60K 23/0808 475/198 |
| 2008/0153649 A1* | 6/2008 | Puiu | B60K 23/04 475/84 |
| 2009/0112430 A1* | 4/2009 | Showalter | B60K 17/046 701/69 |
| 2017/0023114 A1* | 1/2017 | Wang | B60K 17/16 |

* cited by examiner

Primary Examiner — James A Shriver, II
Assistant Examiner — James T Triggs
(74) Attorney, Agent, or Firm — W&K IP(Wayne & King)

(57) ABSTRACT

The present invention discloses a dual-motor coupling drive axle with a torque vectoring function. The dual-motor coupling drive axle includes: a main drive mechanism; a bevel gear differential; a TV control drive mechanism; a first single-row planetary gear train, of which a first sun gear is rotatably supported on a first half shaft and a first gear ring is connected with an output end of the TV control drive mechanism; a second single-row planetary gear train, of which a second gear ring is fixed to a drive axle housing and a second sun gear is coaxially and fixedly connected with the first sun gear; a third single-row planetary gear train.

10 Claims, 10 Drawing Sheets

DUAL-MOTOR COUPLING DRIVE AXLE WITH TORQUE VECTORING FUNCTION

CROSS-REFERENCE TO RELATED APPLICATIONS

This application claims priority to Chinese Patent Application No. 201710266046.1 with a filing date of Apr. 21, 2017. The content of the aforementioned applications, including any intervening amendments thereto, are incorporated herein by reference.

TECHNICAL FIELD

The present invention belongs to the technical field of drive of electric vehicles, and particularly relates to a dual-motor coupling drive axle with a torque vectoring function.

BACKGROUND OF THE PRESENT INVENTION

Due to environmental pollution, energy crisis and other problems are increasingly serious, and more and more countries around the world have paid attention to the development of energy-saving and environmental-friendly automobiles. An electric automobile as an automobile with almost zero emission becomes a new favorite in the automotive industry, and has been rapidly developed in recent years. Because of inherent advantages, the electric automobile has great development potential.

At the present stage, since technical bottleneck problems of poor motor heat dissipation, extremely large unsprung mass and the like in an electric automobile driven by a wheel hub motor are not solved, the electric automobile is generally driven to run by adopting a power assembly composed of a single motor and a drive axle or a power assembly composed of the single motor, a transmission and the drive axle. Therefore, most of the power assemblies of existing electric automobiles include the drive axle.

Generally, the drive axle in the electric automobile is similar to a drive axle in a traditional internal combustion engine automobile and only plays the role of reducing speed and increasing a torque; and the torque of the motor is amplified and transmitted onto wheels to drive the automobile to run. Therefore, because of a "differential without differential torque" principle in a traditional differential in the drive axle, a drive torque is equally vectored to wheels on left and right sides. In this way, ground adhesive force cannot be well utilized under the condition that ground adhesion is not uniform, and even slippage of the wheels and other unsteady running conditions may be easily caused on one side with low adhesion, so that the adhesive capability of a drive wheel cannot be achieved. Meanwhile, when the automobile turns at high speed, it is known from a d'Alembert's principle that, a load of the automobile may be horizontally transferred. At this moment, the load inside the automobile is decreased, and the load outside the automobile is increased. Therefore, adhesion property on the inner side is worsen, the inside wheels may slip if the torque is still equally vectored by the drive axle, and the automobile is instable. Therefore, the torque of the inside wheels of the automobile should be decreased, and the torque of outside wheels should be increased, so that lateral force margin of the inside wheels may be increased to prevent the wheels from slipping, and an additional yawing moment may be generated to the complete vehicle to facilitate vehicle turning, thereby increasing turning maneuverability and ultimate turning capability of the vehicle. At present, the technology is mainly applied to some traditional high-end internal combustion engine automobiles in a torque vectoring differential form, such as a super handling all-wheel drive system (SH-AWD) developed by Honda Company, a super active yawing control (SAYC) system developed by Mitsubishi Corporation, and the like. These torque vectoring differentials greatly increase drivebility and ultimate turning capability of the vehicle. However, the torque vectoring technology is not actually feasibly applied on the electric automobile.

In addition, since the electric automobile is generally driven to run by adopting the power assembly composed of the single motor and the drive axle or the power assembly composed of the single motor, the transmission and the drive axle, in order to meet various complicated driving conditions of the automobile, it is necessary to require that a single drive motor of the electric automobile has higher stand-by power, and then a similar phenomenon that "a big horse hauls a small carriage" in the traditional internal combustion engine automobile inevitably exists in most of the driving conditions, i.e., drive efficiency is not very high. In order to improve the drive efficiency of the electric automobile driven by a single motor, the automobile may be driven to run by adopting a primary drive motor and a secondary drive motor by virtue of a design idea of a power assembly of a hybrid electric vehicle. The primary motor provides constant power output, and the secondary motor is used for "peak-load shifting", thereby regulating a working range of the primary motor and increasing the drive efficiency of the complete vehicle.

Therefore, in order to apply the torque vectoring technology to the electric automobile, increase the turning maneuverability and driving pleasure of the electric automobile, and increase the drive efficiency of the electric automobile by virtue of the technical advantages of the dual-motor coupling drive, a dual-motor coupling drive axle with a torque vectoring function should be designed.

SUMMARY OF PRESENT INVENTION

A purpose of the present invention is to provide a dual-motor coupling drive axle with a torque vectoring function, for overcoming the defect that left and right output torques of a differential in a traditional drive axle are equal and cannot be regulated.

Another purpose of the present invention is to enable a control drive mechanism to perform torque vectoring and to realize torque coupling with a primary drive motor so as to drive an automobile to run.

A technical solution provided by the present invention is as follows:

A dual-motor coupling drive axle with a torque vectoring function includes:

a main drive mechanism arranged on one side of a differential, wherein an output end of the main drive mechanism is connected with a differential housing, so that rotary power may be transferred to the differential housing to drive the vehicle to run;

a TV control drive mechanism arranged on the other side of the differential for outputting control power;

a first single-row planetary gear train including a first sun gear, a first planetary gear, a first planet carrier and a first gear ring, wherein the first sun gear is rotatably supported on a first half shaft, and the first gear ring is connected with an output end of the TV control drive mechanism;} a second single-row planetary gear train including a second sun gear, a second planetary gear, a second planet carrier and a second gear ring, wherein the second gear ring is fixed to a drive axle housing, and the second sun gear is coaxially and fixedly connected with the first sun gear;

a third single-row planetary gear train including a third sun gear, a third planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier; and a third clutch respectively connected with the first half shaft and the third planet carrier, for separating or engaging the first half shaft and the third planet carrier, wherein the first single-row planetary gear train and the second single-row planetary gear train have the same characteristic parameter.

Preferably, the dual-motor coupling drive axle further includes:

a second clutch respectively connected with the first planet carrier and the drive axle housing for separating or engaging the first planet carrier and the drive axle housing; and a fourth clutch respectively connected with the third planet carrier and the drive axle housing for separating or engaging the third planet carrier and the drive axle housing.

Preferably, the TV control drive mechanism includes a TV control motor and a TV reducing mechanism.

The TV control motor includes a hollow output shaft; and the first half shaft is rotatably supported on the hollow output shaft and penetrates out of the hollow output shaft.

Preferably, the TV reducing mechanism includes:

a fourth single-row planetary gear train including a fourth sun gear, a fourth planetary gear, a fourth planet carrier and a fourth gear ring, wherein the fourth sun gear is fixedly connected with the hollow output shaft, and the fourth gear ring is fixed to the drive axle housing; and a fifth single-row planetary gear train including a fifth sun gear, a fifth planetary gear, a fifth planet carrier and a fifth gear ring, wherein the fifth sun gear is fixedly connected with the fourth planet carrier, the fifth gear ring is fixed to the drive axle housing, and the fifth planet carrier is fixedly connected with the first gear ring.

Preferably, the main drive mechanism includes a main drive motor and a main reducing mechanism.

Preferably, the main reducing mechanism includes:

a seventh single-row planetary gear train including a seventh sun gear, a seventh planetary gear, a seventh planet carrier and a seventh gear ring, wherein the seventh sun gear is fixedly connected with an output shaft of the main drive motor, and the seventh gear ring is fixed to the drive axle housing; and a sixth single-row planetary gear train including a sixth sun gear, a sixth planetary gear, a sixth planet carrier and a sixth gear ring, wherein the sixth sun gear is fixedly connected with the seventh planet carrier, the sixth gear ring is fixed to the drive axle housing, and the sixth planet carrier is fixedly connected with the differential housing.

Preferably, the main drive motor includes a hollow output shaft; and a second half shaft is rotatably supported on the hollow output shaft and penetrates out of the hollow output shaft.

A dual-motor coupling drive axle with a torque vectoring function includes:

a main drive mechanism arranged on one side of a differential, wherein an output end of the main drive mechanism is connected with a differential housing, so that rotary power may be transferred to the differential housing;

a TV control drive mechanism arranged on the other side of the differential;

a first single-row planetary gear train including a first sun gear, a first planetary gear, a first planet carrier and a first gear ring, wherein the first sun gear is rotatably supported on a first half shaft, and the first gear ring is connected with an output end of the TV control drive mechanism;

a second single-row planetary gear train including a second sun gear, a second planetary gear, a second planet carrier and a second gear ring, wherein the second gear ring is fixed to a drive axle housing, and the second sun gear is coaxially and fixedly connected with the first sun gear;

a third two-stage single-row planetary gear train including a third sun gear, a third two-stage planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier;

a second clutch respectively connected with the first planet carrier and the drive axle housing for separating or engaging the first planet carrier and the drive axle housing;

a third clutch respectively connected with the first half shaft and the third planet carrier for separating or engaging the first half shaft and the third planet carrier; and a fourth clutch respectively connected with the third planet carrier and the drive axle housing for separating or engaging the third planet carrier and the drive axle housing, wherein the first single-row planetary gear train and the second single-row planetary gear train have the same characteristic parameter.

A dual-motor coupling drive axle with a torque vectoring function includes:

a main drive mechanism arranged on one side of a differential, wherein an output end of the main drive mechanism is connected with a differential housing, so that rotary power may be transferred to the differential housing;

a TV control drive mechanism arranged on the other side of the differential;

a first single-row two-stage planetary gear train including a first sun gear, a first two-stage planetary gear, a first planet carrier and a first gear ring, wherein the first sun gear is rotatably supported on a first half shaft, and the first gear ring is connected with an output end of the TV control drive mechanism;

a second single-row two-stage planetary gear train including a second sun gear, a second two-stage planetary gear, a second planet carrier and a second gear ring, wherein the second gear ring is fixed to a drive axle housing, and the second sun gear is coaxially and fixedly connected with the first sun gear;

a third single-row planetary gear train including a third sun gear, a third planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier;

a second clutch respectively connected with the first planet carrier and the drive axle housing for separating or engaging the first planet carrier and the drive axle housing;

a third clutch respectively connected with the first half shaft and the third planet carrier for separating or engaging the first half shaft and the third planet carrier; and a fourth clutch respectively connected with the third planet carrier and the drive axle housing for separating or engaging the third planet carrier and the drive axle housing, wherein the first single-row two-stage planetary gear train and the second single-row two-stage planetary gear train have the same characteristic parameter.

A dual-motor coupling drive axle with a torque vectoring function includes:

a main drive mechanism arranged on one side of a differential, wherein an output end of the main drive mechanism is connected with a differential housing, so that rotary power may be transferred to the differential housing;

a TV control drive mechanism arranged on the other side of the differential;

a first single-row two-stage planetary gear train including a first sun gear, a first two-stage planetary gear, a first planet carrier and a first gear ring, wherein the first sun gear is rotatably supported on a first half shaft, and the first gear ring is connected with an output end of the TV control drive mechanism;

a second single-row two-stage planetary gear train including a second sun gear, a second two-stage planetary gear, a second planet carrier and a second gear ring, wherein the second gear ring is fixed to a drive axle housing, and the second sun gear is coaxially and fixedly connected with the first sun gear;

a third single-row two-stage planetary gear train including a third sun gear, a third two-stage planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier;

a second clutch respectively connected with the first planet carrier and the drive axle housing for separating or engaging the first planet carrier and the drive axle housing;

a third clutch respectively connected with the first half shaft and the third planet carrier for separating or engaging the first half shaft and the third planet carrier; and a fourth clutch respectively connected with the third planet carrier and the drive axle housing for separating or engaging the third planet carrier and the drive axle housing, wherein the first single-row two-stage planetary gear train and the second single-row two-stage planetary gear train have the same characteristic parameter.

The present invention has beneficial effects as follows:

1, the dual-motor coupling drive axle with the torque vectoring function in the present invention overcomes the defect of "differential without differential torque" in the differential in the traditional drive axle and may optionally vector torques to wheels on the left and right sides on premise of not changing the total longitudinal drive torque, thereby increasing the turning maneuverability and driving pleasure of the vehicle;

2, according to the dual-motor coupling drive axle with the torque vectoring function in the present invention, the main drive motor, the TV control motor and the traditional gear are integrated in the drive axle to integrate drive and transmission, and the main drive motor and the TV control motor are arranged coaxially, so that the structure is more compact and a space utilization rate is high;

3, according to the dual-motor coupling drive axle with the torque vectoring function in the present invention, most of the mass belongs to the sprung mass, and a smoothness influence is small during running of the automobile; and 4, according to the dual-motor coupling drive axle with the torque vectoring function in the present invention, the TV control motor may serve as an assisted motor when torque vectoring is not performed, and is coupled to the torque of the main drive motor to drive the automobile to run, thereby increasing power performance of the automobile, meeting high-power needs under special working conditions, additionally increasing the utilization rate of the TV control motor and improving the total drive efficiency.

DETAILED DESCRIPTION OF PREFERRED EMBODIMENTS

The present invention is further described below in detail in combination with drawings to enable those skilled in the art to implement the present invention with reference to words in the description.

Embodiment 1

Figure 1:
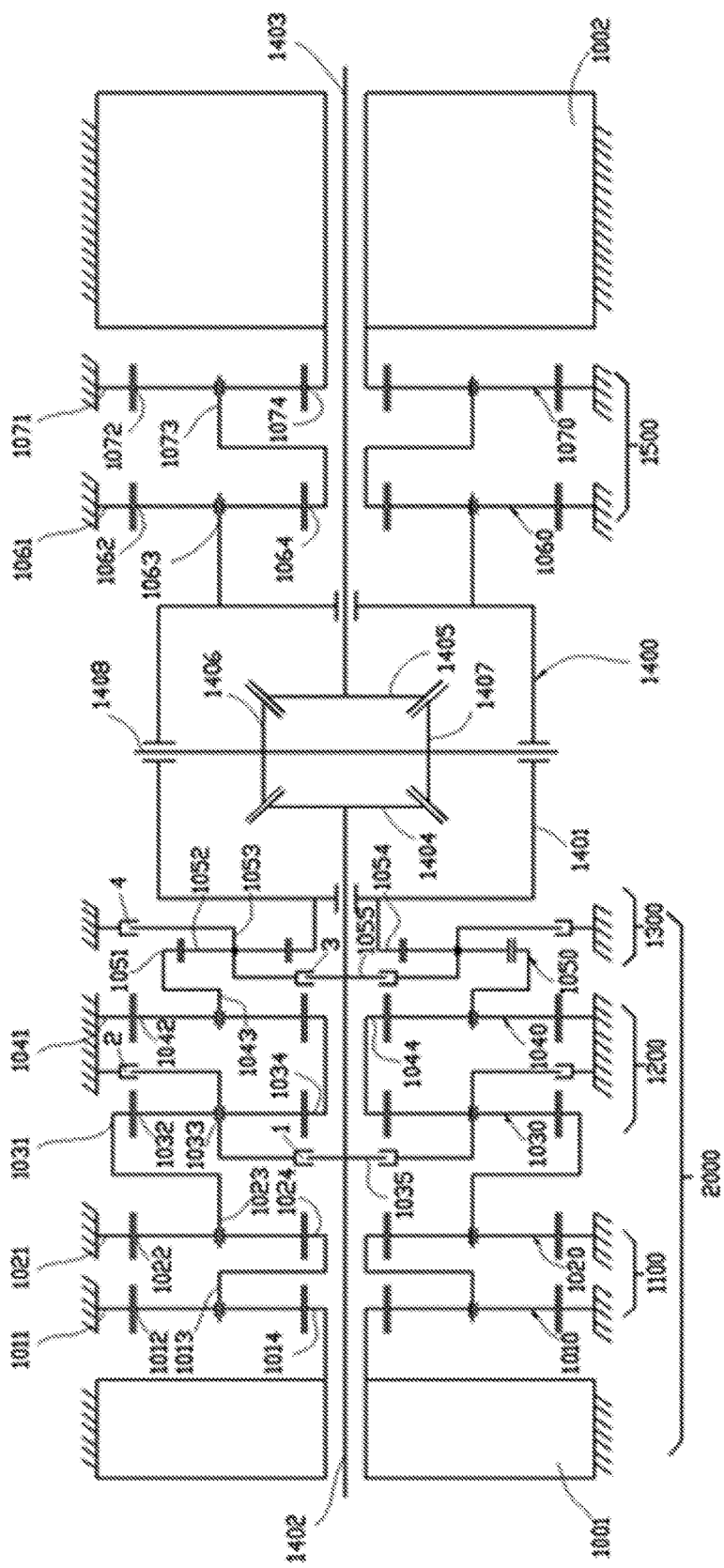
FIG. 1 is a structural schematic diagram of a dual-motor coupling drive axle with a torque vectoring function in embodiment 1 of the present invention.

As shown in FIG. 1, a dual-motor coupling drive axle with a torque vectoring function is mainly composed of a torque vectoring device 2000, a traditional bevel gear differential 1400, a main reducing mechanism 1500 and a main drive motor 1002.

In the present embodiment, the torque vectoring device 2000 is positioned on a left side of the drive axle and mainly composed of a TV control motor 1001, a TV reducing mechanism 1100, a two-row planetary TV coupling mechanism 1200, a single-row planetary differential coupling mechanism 1300, a first clutch 1, a second clutch 2, a third clutch 3 and a fourth clutch 4.

The TV control motor 1001 is a hollow shaft type inner rotor motor and is connected with a first half shaft 1402 of a wheel on the left side to penetrate out of a hollow rotor shaft inner hole; a hollow shaft type inner rotor is connected with a fourth sun gear 1014 of a fourth planetary gear train 1010 by a spline; and an output torque of the TV control motor 1001 is inputted to the fourth planetary gear train 1010. The TV control motor 1001 is supported on the first half shaft 1402 by a bearing, and a stator and a housing of the TV control motor 1001 are fixed with a drive axle housing.

The TV reducing mechanism 1100 mainly includes the fourth planetary gear train 1010 and a fifth planetary gear train 1020. The fourth planetary gear train 1010 includes the fourth sun gear 1014, three fourth planetary gears 1012 distributed along a circumference uniformly, a fourth planet carrier 1013 and a fourth gear ring 1011 fixed to the drive axle housing. The fourth sun gear 1014 is connected with the hollow shaft type inner rotor of the TV control motor 1001 by a spline, and the fourth planet carrier 1013 and a fifth sun gear 1024 of the fifth planetary gear train 1020 are formed into a whole. The fifth planetary gear train 1020 includes a fifth sun gear 1024, three fifth planetary gears 1022 distributed along a circumference uniformly, a fifth planet carrier 1023 and a fifth gear ring 1021 fixed to the drive axle housing. The fifth sun gear 1024 is supported on the first half shaft 1402 by a bearing, and the fifth planet carrier 1023 and a first gear ring 1031 of a first single-row planetary gear train 1030 are formed into a whole.

Preferably, the TV reducing mechanism 1100 may be composed of a single-row planetary gear train, a multi-row planetary gear train or reducing mechanisms of other forms. Therefore, transformation of the form of the reducing mechanism 1100 is not regarded as the innovation of the present invention.

The two-row planetary TV coupling mechanism 1200 mainly includes the first single-row planetary gear train 1030, a second single-row planetary gear train 1040, the first clutch 1 and the second clutch 2. The first single-row planetary gear train 1030 and the second single-row planetary gear train 1040 must have the same planetary row characteristic parameters and consistent types of the planetary rows. The first single-row planetary gear train 1030 includes a first sun gear 1034, three first planetary gears 1032 distributed along a circumference uniformly, the first planet carrier 1033, the first gear ring 1031 and a driven disc 1035, wherein the first gear ring 1031 and the fifth planet carrier 1023 of the fifth planetary gear train 1020 are formed into a whole, and the first sun gear 1034 and a second sun gear 1044 in the second single-row planetary gear train 1040 are formed into a whole and supported on the first half shaft 1402 by the bearing. The driven disc 1035 is connected with the first half shaft 1402 by a spline, and a left end of a first planet carrier 1033 is connected with the driven disc 1035 by virtue of the first clutch 1. When the first clutch 1 is engaged, the first planet carrier 1033 is fixedly connected with the driven disc 1035, and the first half shaft 1402 and the first planet carrier 1033 rotate at an equal speed; and when the first clutch 1 is separated, the first planet carrier 1033 is disconnected with the driven disc 1035, and the first half shaft 1402 and the first planet carrier 1033 independently rotate respectively. A right end of the first planet carrier 1033 is connected with the drive axle housing by virtue of the second clutch 2. When the second clutch 2 is engaged, the first planet carrier 1033 is fixed to the drive axle housing; and when the second clutch 2 is separated, the first planet carrier 1033 can rotate relative to the drive axle housing. The second single-row planetary gear train 1040 includes the second sun gear 1044, three second planetary gears 1042 distributed along a circumference uniformly, a second planet carrier 1043 and a second inner gear ring 1041 fixed to the drive axle housing, wherein the second planet carrier 1043 and a third gear ring 1051 of a third single-row planetary gear train 1050 are formed into a whole, and the second sun gear 1044 and the first sun gear 1034 in the first single-row planetary gear train 1030 are formed into a whole and supported on the first half shaft 1402 by the bearing.

It should be indicated that, the replacement of a clutch type or an engagement manner of the first clutch 1 and the second clutch 2 is not regarded as the innovation of the present invention.

The single-row planetary differential coupling mechanism 1300 is mainly composed of the third single-row planetary gear train 1050, the third clutch 3 and the fourth clutch 4. The third single-row planetary gear train 1050 includes a third sun gear 1054, three third planetary gears 1052 distributed along a circumference uniformly, a third planet carrier 1053, the third gear ring 1051 and a driven disc 1055, wherein the third sun gear 1054 and a differential housing 1401 are formed into a whole, the third gear ring 1051 and the second planet carrier 1043 of the second single-row planetary gear train 1040 are formed into a whole, the driven disc 1055 is connected with the first half shaft 1402 by a spline, and a left end of the third planet carrier 1053 is connected with the driven disc 1055 by virtue of the third clutch 3. When the third clutch 3 is engaged, the third planet carrier 1053 is fixedly connected with the driven disc 1055, and the first half shaft 1402 and the third planet carrier 1053 rotate at an equal speed; and when the third clutch 3 is separated, the third planet carrier 1053 is disconnected with the driven disc 1055, and the first half shaft 1402 and the third planet carrier 1053 independently rotate respectively. A right end of the third planet carrier 1053 is connected with the drive axle housing by virtue of the fourth clutch 4. When the fourth clutch 4 is engaged, the third planet carrier 1053 is fixed to the drive axle housing; and when the fourth clutch 4 is separated, the third planet carrier 1053 can rotate relative to the drive axle housing.

It should be indicated that, the replacement of a clutch type or an engagement manner of the third clutch 3 and the fourth clutch 4 is not regarded as the innovation of the present invention.

The traditional bevel gear differential 1400 is mainly composed of the differential housing 1401, the first half shaft 1402, a second half shaft 1403, a first half shaft gear 1404, a second half shaft gear 1405, two conical planetary gears 1406 and 1407 and a planetary gear shaft 1408, wherein the first half shaft gear 1404 is connected with the first half shaft 1402 by a spline, the second half shaft gear 1405 is connected with the second half shaft 1403 by a spline, and the differential housing 1401 is supported on the first half shaft 1402 and the second half shaft 1403 by bearings.

The main reducing mechanism 1500 is positioned on the right side of the drive axle and mainly composed of a sixth planetary gear train 1060 and a seventh planetary gear train 1070. The sixth planetary gear train 1060 includes a sun gear 1064, three planetary gears 1062 distributed along a circumference uniformly, a planet carrier 1063 and an inner gear ring 1061 fixed to the drive axle housing, wherein the planet carrier 1063 and the differential housing 1401 are formed into a whole, the sun gear 1064 and a planet carrier 1073 of the seventh planetary gear train 1070 are formed into a whole, and the sun gear 1064 is supported on the second half shaft 1403 by a bearing. The seventh planetary gear train 1070 includes a sun gear 1074, three planetary gears 1072 distributed along a circumference uniformly, a planet carrier 1073 and an inner gear ring 1071 fixed to the drive axle housing, wherein the sun gear 1074 is connected with the hollow inner rotor shaft of the main drive motor 1002 by a spline.

Preferably, the main reducing mechanism 1500 may be composed of a single-row planetary gear train, a multi-row planetary gear train or reducing mechanisms of other forms. Therefore, transformation of the form of the main reducing mechanism 1500 is not regarded as the innovation of the present invention.

The main drive motor 1002 is positioned on the right side of the drive axle, is a hollow shaft type inner rotor motor and is connected with the second half shaft 1403 of a wheel on the right side to penetrate out of a hollow rotor shaft inner hole. A hollow shaft type inner rotor is connected with the sun gear 1074 of a seventh planetary gear train 1070 by a spline. A drive torque may be inputted into the main reducing mechanism 1500 by the main drive motor 1002 through the sun gear 1074, acts on the differential housing 1401 and is finally equally vectored onto the first half shaft 1402 and the second half shaft 1403. The main drive motor 1002 is supported on the second half shaft 1403 by the bearing, and a stator and a housing of the main drive motor 1002 are fixed with the drive axle housing.

Embodiment 2

Figure 2:
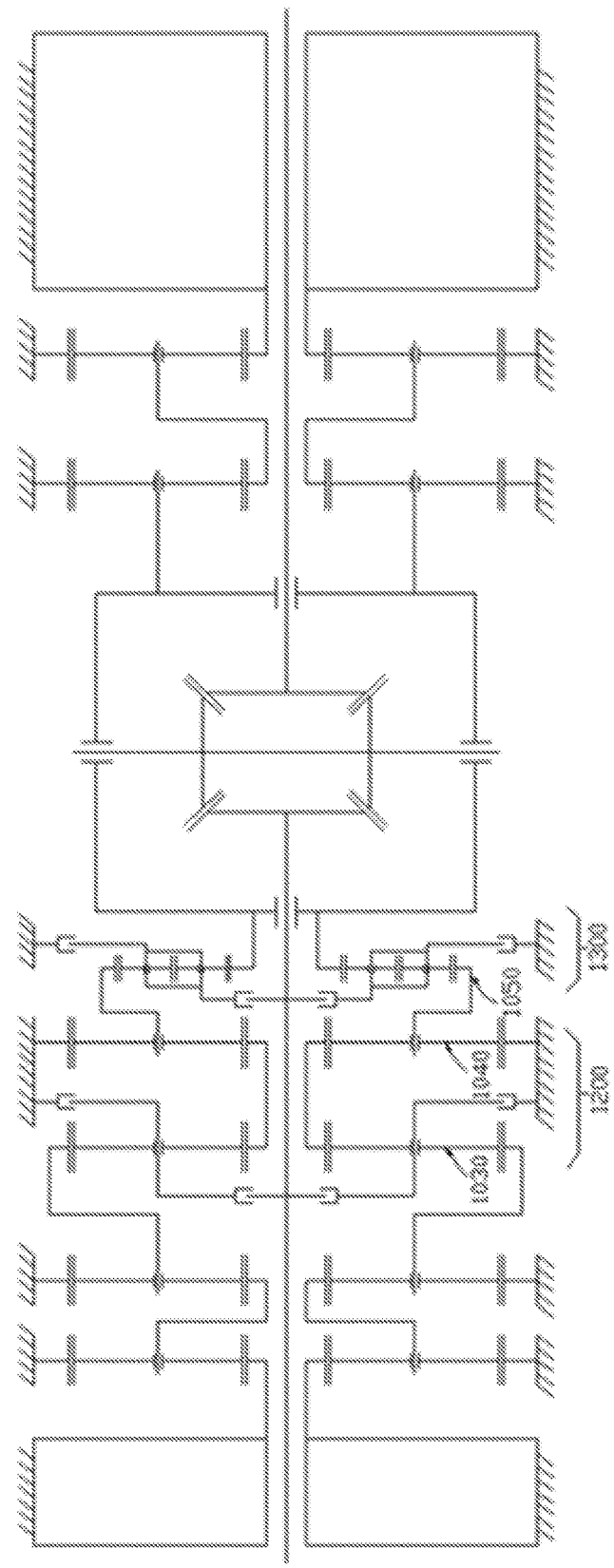
FIG. 2 is a structural schematic diagram of a dual-motor coupling drive axle with a torque vectoring function in embodiment 2 of the present invention.

As shown in FIG. 2, the first single-row planetary gear train 1030 and the second single-row planetary gear train 1040 in the two-row planetary TV coupling mechanism 1200 are single-row single-stage planetary gear trains; the third single-row planetary gear train 1050 in the single-row planetary differential coupling mechanism 1300 is a single-row two-stage planetary gear train; and a structural simplified diagram is shown in the figure. Other structures in the present embodiment are identical with those in embodiment 1.

Embodiment 3

Figure 3:
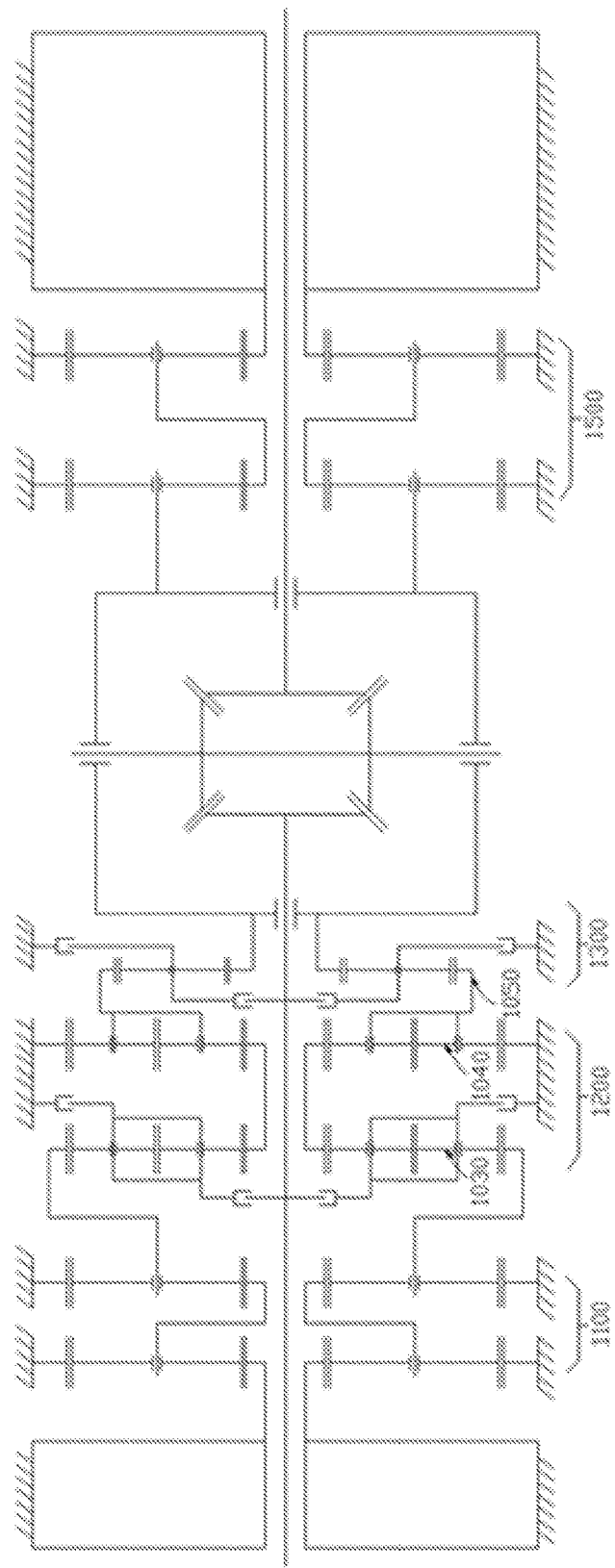
FIG. 3 is a structural schematic diagram of a dual-motor coupling drive axle with a torque vectoring function in embodiment 3 of the present invention.

As shown in FIG. 3, the first single-row planetary gear train 1030 and the second single-row planetary gear train 1040 in the two-row planetary TV coupling mechanism 1200 are single-row two-stage planetary gear trains; the third single-row planetary gear train 1050 in the single-row planetary differential coupling mechanism 1300 is a single-row single-stage planetary gear train; and a structural simplified diagram is shown in the figure. Other structures in the present embodiment are identical with those in embodiment 1.

Embodiment 4

Figure 4:
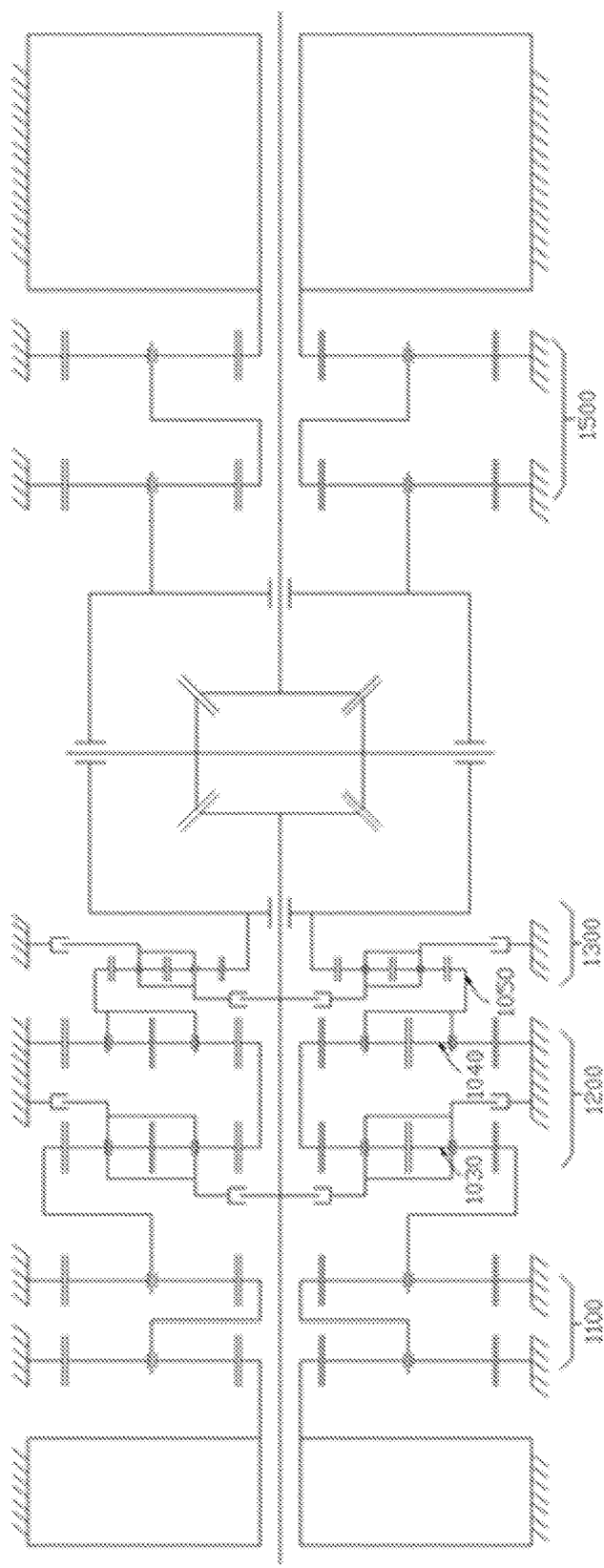
FIG. 4 is a structural schematic diagram of a dual-motor coupling drive axle with a torque vectoring function in embodiment 4 of the present invention.

As shown in FIG. 4, the first single-row planetary gear train 1030 and the second single-row planetary gear train 1040 in the two-row planetary TV coupling mechanism 1200 are single-row two-stage planetary gear trains; the third single-row planetary gear train 1050 in the single-row planetary differential coupling mechanism 1300 is also a single-row two-stage planetary gear train; and a structural simplified diagram is shown in the figure. Other structures in the present embodiment are identical with those in embodiment 1.

Solutions shown in FIGS. 1-4 are realizable embodiment structure solutions of an electric differential with a torque vectoring function in the present invention. However, in consideration of system inertia loss and running efficiency, an embodiment solution shown in FIG. 1 is an optimal solution, a less-preferred solution is the solution shown in FIG. 3, and then are the solutions shown in FIG. 2 and FIG. 4.

Operating principles of the dual-motor coupling drive axle with the torque vectoring function in the present invention are as follows:

1. A Single Drive Mode of a Primary Drive Motor

Figure 5:
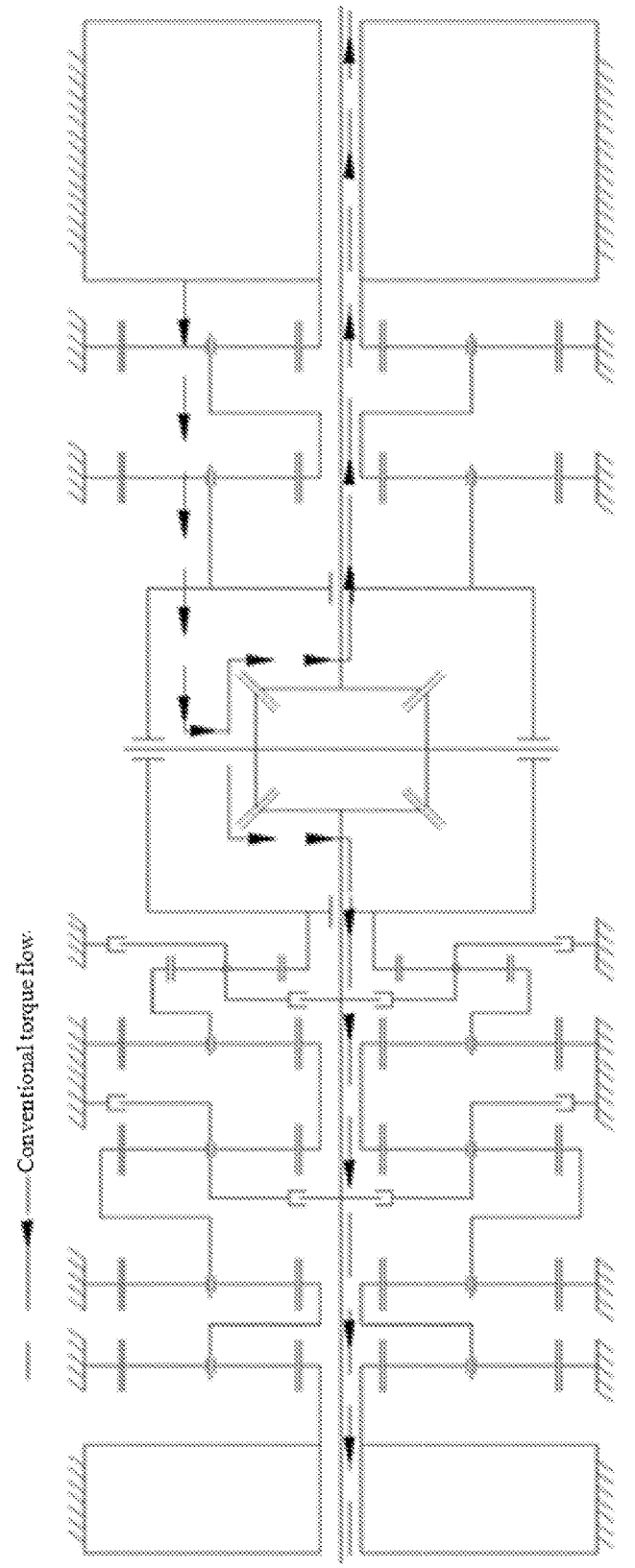
FIG. 5 is a schematic diagram of a torque flow direction of a dual-motor coupling drive axle with a torque vectoring function when going straight or during normal differential turning in the present invention.

When an automobile is under the operating conditions of normally going straight and making normal differential turning, wheels on the left and right sides have the same drive torques, and torque vectoring is not needed. As shown in FIG. 1, at this moment, the first clutch 1, the second clutch 2, the third clutch 3 and the fourth clutch 4 are all disconnected; the TV control motor is not started; the torque vectoring device 2000 is not involved in drive of the vehicle; the automobile is driven by the primary drive motor 1002 only; and the torque outputted by the primary drive motor 1002 is increased by the main reducing mechanism 1500 and acts on the differential housing 1401. Due to an equal vectoring principle of the torque of the traditional bevel gear differential mechanism 1400, the torque that acts on the differential housing 1401 is equally vectored to the first half shaft 1402 and the second half shaft 1403 so as to drive the automobile to run. At this moment, a torque vectoring flow is shown in FIG. 5.

2. A Torque Vectoring Mode

Figure 6:
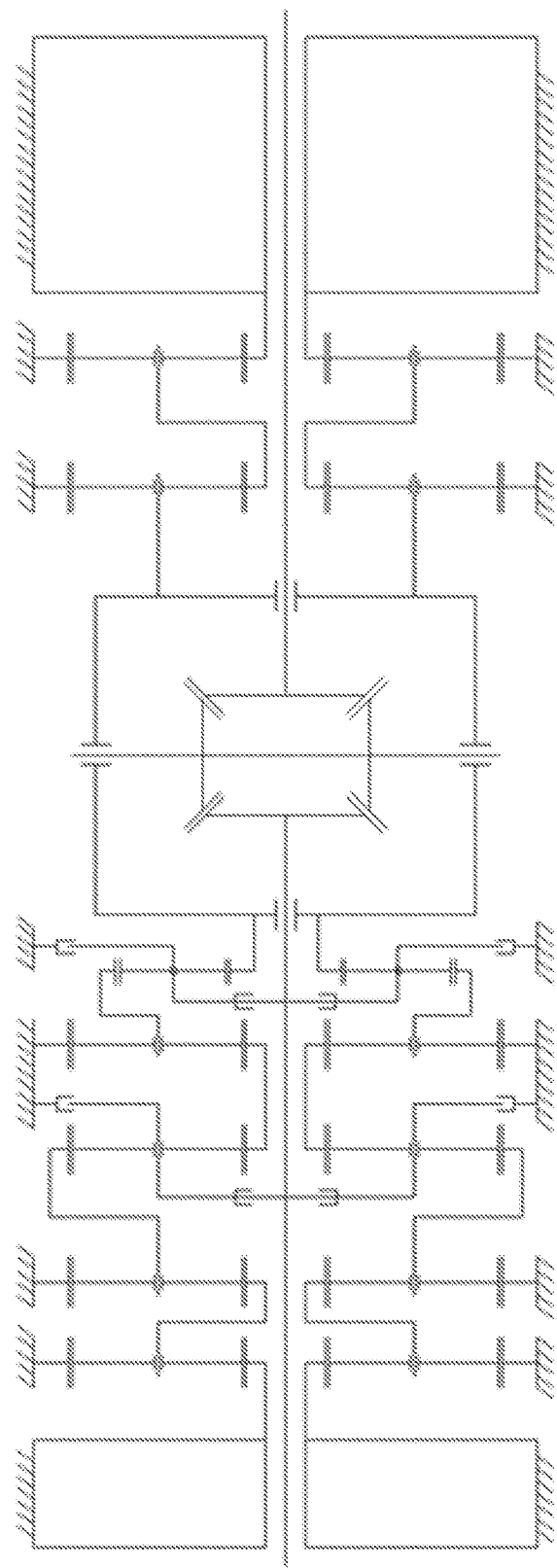
FIG. 6 is a structural simplified diagram of a dual-motor coupling drive axle with a torque vectoring function in a torque vectoring mode in the present invention.

When the automobile is turned at medium and high speed, and a torque on a wheel on an inner side should be vectored to a wheel on an outer side to increase turning maneuverability, as shown in FIG. 6, the first clutch 1 and the third clutch 3 are engaged; the second clutch 2 and the fourth clutch 4 are separated; the first planet carrier 1033 in the first single-row planetary gear train 1030 is connected with the driven disc 1035 and the first half shaft 1402; the third planet carrier 1053 in the third single-row planetary gear train 1050 is connected with the driven disc 1055 and the first half shaft 1402; and the torque vectoring device 2000 is involved in drive of the vehicle, thereby performing torque vectoring of the wheels on the both sides.

Assuming that a rotating direction of the wheel is a positive direction during drive of the automobile, otherwise a negative direction, and taking left turning of the automobile as an example for analysis:

then the TV control motor 1001 is controlled to output a positive torque $T_0$; after the torque is increased by reducing speed by the TV reducing mechanism 1100, a moment of the first gear ring 1031 inputted into the two-row planetary TV coupling mechanism 1200 is $iT_0$, wherein i is a transmission ratio of the TV reducing mechanism 1100. Thus, a moment inputted into the first half shaft 1402 by the first planet carrier 1033 in the first single-row planetary gear train 1030 is $$\frac{i(k+1)T_0}{k},$$

wherein k is a planetary row characteristic parameter of the first single-row planetary gear train 1030 and the second single-row planetary gear train 1040. Then, a moment inputted into the third gear ring 1051 of the single-row planetary differential coupling mechanism 1300 by the TV control motor 1001 is $$-\frac{i(k+1)T_0}{k}.$$

Therefore, the torque inputted into the first half shaft of the third planet carrier 1053 in the third single-row planetary gear train 1050 is $$-\frac{i(k+1)(k_5+1)T_0}{kk_5},$$

wherein $k_5$ is a planetary row characteristic parameter of the third single-row planetary gear train 1050. Similarly, a moment inputted into the differential housing 1401 by the third sun gear 1054 in the third single-row planetary gear train 1050 is $$\frac{i(k+1)T_0}{kk_5}.$$

Therefore, a moment which is equally vectored to the first half shaft 1402 and the second half shaft 1403 by the differential housing 1401 is $$\frac{i(k+1)T_0}{2kk_5}.$$

The moment inputted into the first half shaft 1402 by the TV control motor 1001 is finally formed by a sum of three parts, i.e., the moment inputted into the first half shaft 1402 by the first planet carrier 1033 in the first single-row planetary gear train 1030 by virtue of the first clutch 1, the moment inputted into the first half shaft 1402 by the third planet carrier 1053 in the third single-row planetary gear train 1050 by virtue of the third clutch 3, and the moment equally vectored to the first half shaft by the differential housing 1401. The result of the moment is $$-\frac{i(k+1)T_0}{2kk_5}.$$

The moment finally inputted into the second half shaft 1403 by the TV control motor 1001 is $$\frac{i(k+1)T_0}{2kk_5}.$$

Figure 7:
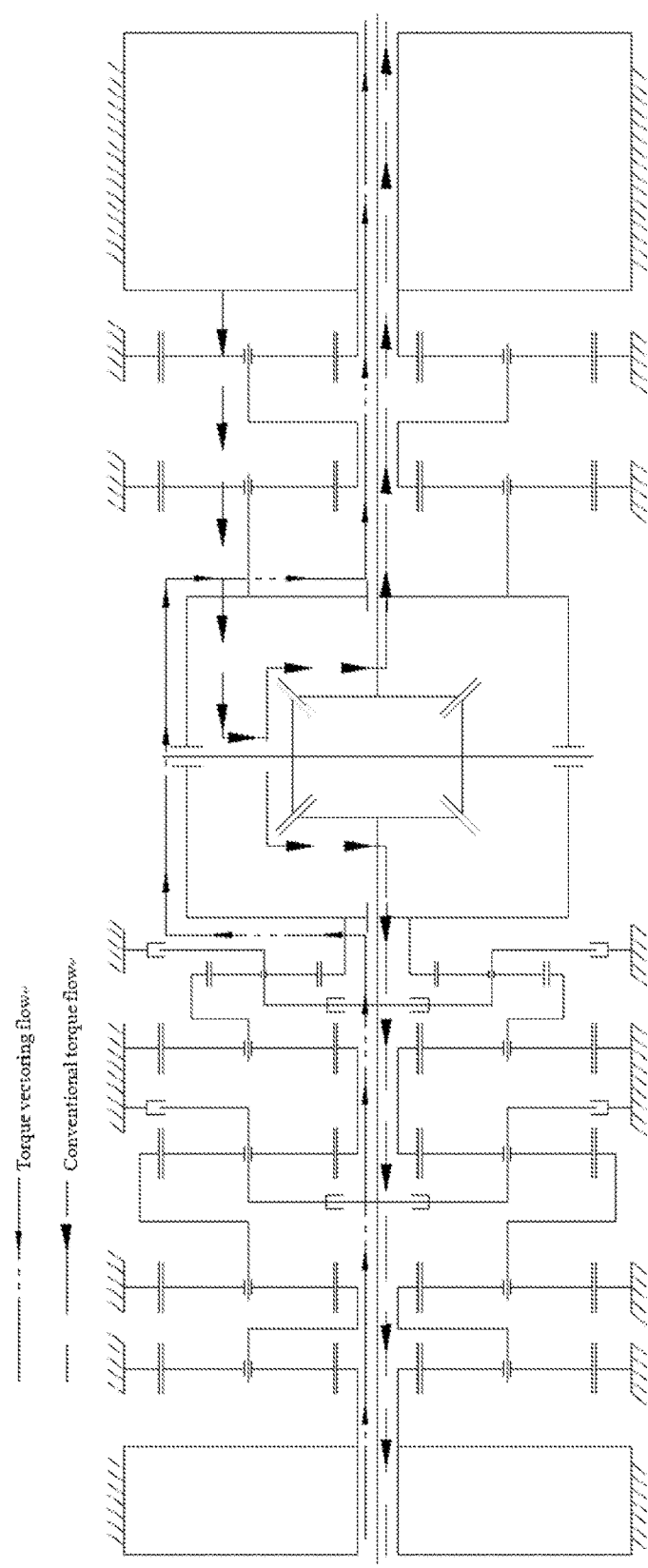
FIG. 7 is a schematic diagram of a torque flow direction of a dual-motor coupling drive axle with a torque vectoring function in a torque vectoring mode during left turning of an automobile and an operation of a torque vectoring device in the present invention.

It can be seen from the above that, the moment inputted into the first half shaft 1402 and the second half shaft 1403 by the TV control motor 1001 is equal and opposite in directions. Therefore, the total longitudinal drive torque is not changed; the torque of the wheel on the left side connected with the first half shaft 1402 is decreased; the torque of the wheel on the right side connected with the second half shaft 1403 is increased; a yawing moment contributing to left turning may be generated; the left-turning maneuverability of the automobile is increased; and the torque vectoring flow is shown in FIG. 7. It should be indicated that, if the TV control motor outputs a negative torque at this moment, then the drive torque will be vectored from the wheel on the right side to the wheel on the left side, and a yawing moment that prevents over-steering of the vehicle is generated for maintaining automotive stability.

Figure 8:
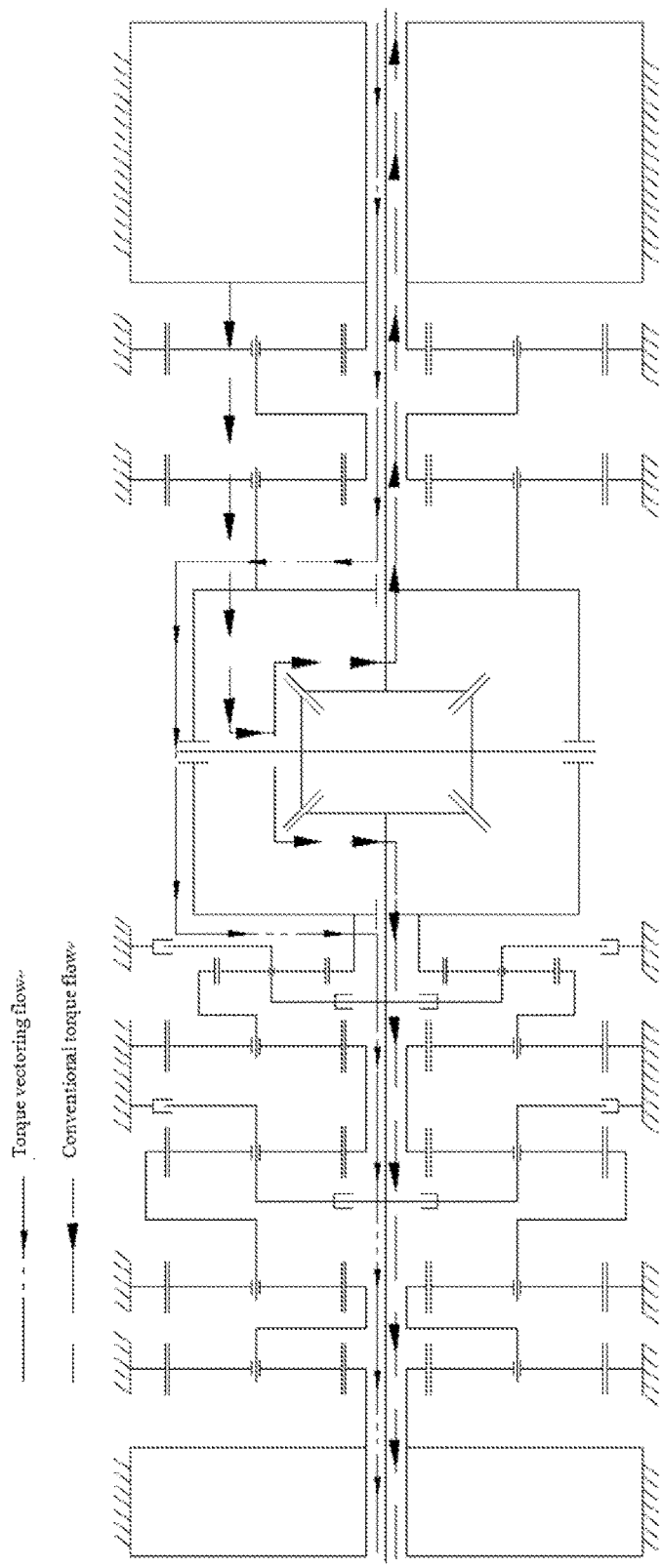
FIG. 8 is a schematic diagram of a torque flow direction of a dual-motor coupling drive axle with a torque vectoring function in a torque vectoring mode during right turning of an automobile and an operation of a torque vectoring device in the present invention.

Similarly, when the automobile turns right at medium and high speed, the motor controller controls the TV control motor 1001 to output a negative torque, and a yawing moment contributing to right turning may be generated on premise of not changing the total longitudinal drive torque, thereby enhancing the right-turning maneuverability of the automobile. The torque vectoring flow is shown in FIG. 8. It should be indicated that, if the TV control motor outputs a positive torque at this moment, then the drive torque will be vectored from the wheel on the left side to the wheel on the right side, and a yawing moment that prevents over-steering of the vehicle is generated for maintaining the automotive stability.

3. A TV Control Motor Assistant Mode

When the automobile does not need to increase the turning maneuverability and maintain the stability, the TV control motor does not work, such as under operating conditions of going straight and making normal differential turning of the automobile. In order to increase a utilization rate of a power assembly and the drive efficiency and avoid reactive loss, when the automobile is in some specific operating conditions, the TV control motor and the main drive motor drive the automobile to run together. At this moment, the main drive motor provides basic constant power output, and the TV control motor performs "peak-load shifting", i.e., under the operating conditions of starting or rapidly speeding up, the need for the torque is great, and in order to prevent the main drive motor from entering a low-efficiency interval of a peak load, the TV control motor is controlled to participate in drive, and the output torque is coupled to the main drive motor to drive the automobile to run together. When a required power for the complete automobile is low and is in a high-efficiency interval of the TV control motor (such as, medium-small load low-speed running conditions), the TV control motor may be controlled to independently drive the vehicle to run; when required power for the complete automobile is in a high-efficiency interval of the main drive motor (such as, medium-load and constant medium-high-speed running conditions), the main drive motor independently drives the vehicle to run; and when required power for the complete automobile is lower than an output power corresponding to the high-efficiency interval of the main drive motor, the main drive motor may be responsible for driving the vehicle to run and also driving the TV control motor to perform anti-drag power generation. The TV control motor is used to regulate an operating point of the main drive motor to enable the operating point to fall into the high-efficiency interval, thereby increasing the drive efficiency of the complete automobile. However, secondary energy conversion loss may be caused in this operation condition, so such a condition is not adopted generally.

Figure 9:
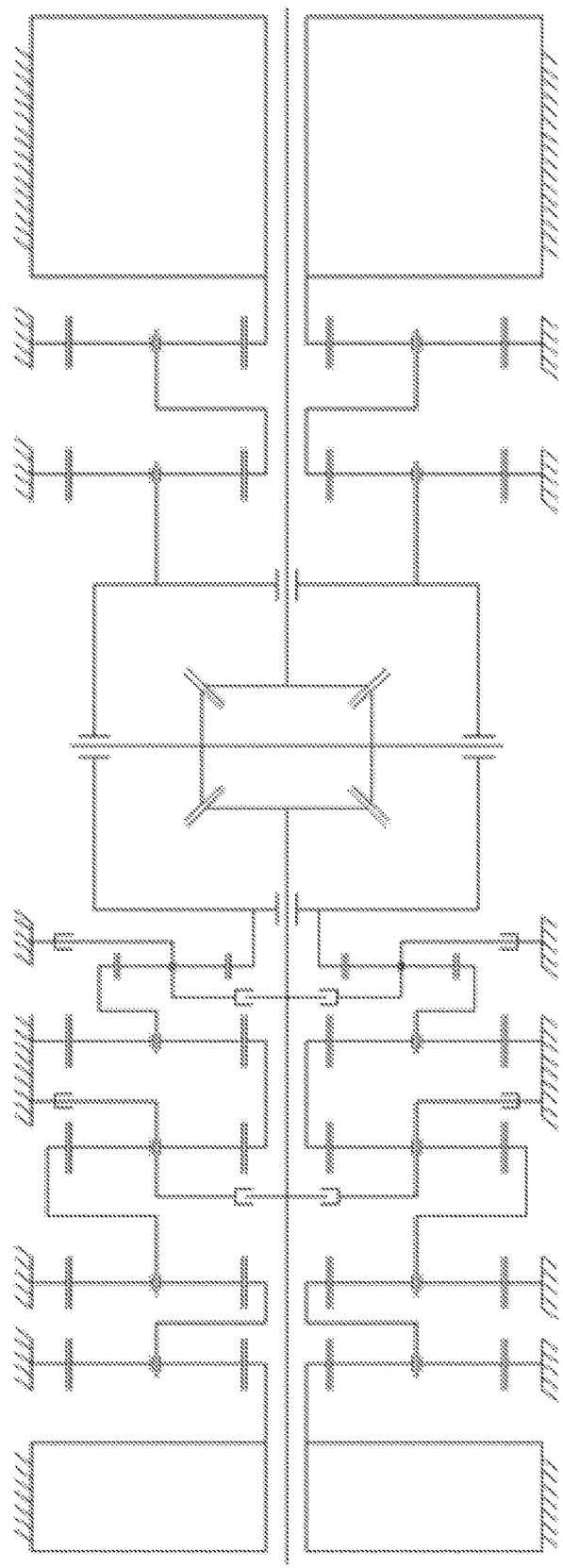
FIG. 9 is a structural simplified diagram of a dual-motor coupling drive axle with a torque vectoring function in a TV control motor assistant mode in the present invention.
Figure 10:
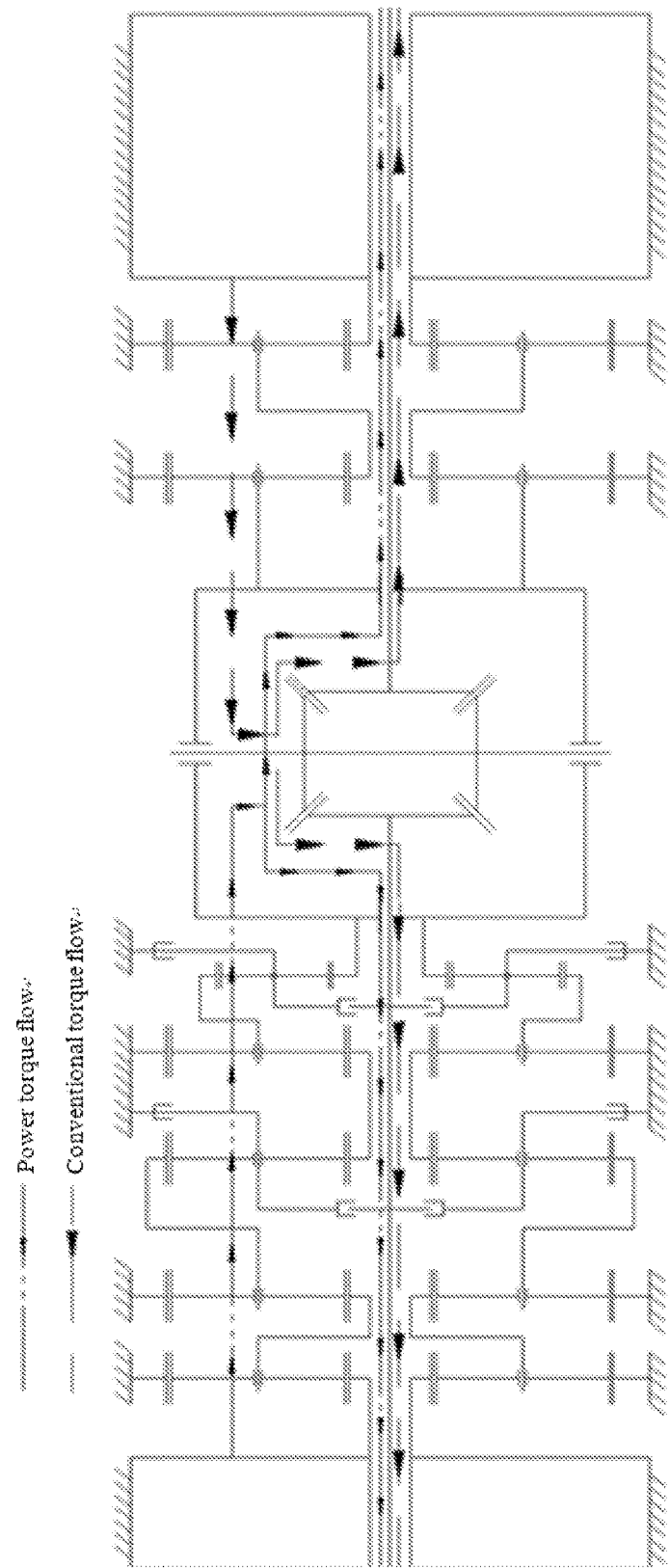
FIG. 10 is a schematic diagram of a torque flow direction of a dual-motor coupling drive axle with a torque vectoring function in a TV control motor assistant mode in the present invention.

As shown in FIG. 9, the first clutch 1 and the third clutch 3 are separated at this moment; the second clutch 2 and the fourth clutch 4 are engaged; the first planet carrier 1033 in the first single-row planetary gear train 1030 is fixed to the drive axle housing; and the third planet carrier 1053 in the third single-row planetary gear train 1050 is fixed to the drive axle housing. The torque vectoring device 2000 is only connected with the differential housing 1401, is not connected with the first half shaft 1402 and becomes a reducing mechanism. The torque of the TV control motor is further amplified and applied to the differential housing. At this moment, the TV control motor and the main drive motor may independently drive the vehicle to run respectively and may also be coupled in parallel to drive the vehicle to run. During coupling drive, on one hand, a higher drive torque may be provided for the automobile to meet the need of accelerating the power for the complete automobile; and on the other hand, the TV control motor may perform anti-drag power generation to regulate the operating point of the main drive motor, thereby optimizing the drive efficiency of the main motor. However, the secondary energy conversion loss will in increased, so this condition is not adopted generally. The torque vectoring flow is shown in FIG. 10.

Although the embodiments of the present invention are disclosed above, the present invention is not only limited to applications listed in description and embodiments and is completely applicable to various fields suitable for the present invention. Additional modifications may be easily realized by those skilled in the art. Therefore, the present invention is not limited to specific details and illustrated and described figures herein on premise of not deviating from general concepts defined by claims and equivalent scopes.

We claim:

1. A dual-motor coupling drive axle with a torque vectoring function, comprising:
    a main drive mechanism arranged on one side of a differential, wherein an output end of the main drive mechanism is connected with a differential housing, so that rotary power is transferred to the differential housing to drive the vehicle to run;
    a TV control drive mechanism arranged on the other side of the differential for outputting control power;
    a first single-row planetary gear train including a first sun gear, a first planetary gear, a first planet carrier and a first gear ring, wherein the first sun gear is rotatably supported on a first half shaft, and the first gear ring is connected with an output end of the TV control drive mechanism;
    a second single-row planetary gear train including a second sun gear, a second planetary gear, a second planet carrier and a second gear ring, wherein the second gear ring is fixed to a drive axle housing, and the second sun gear is coaxially and fixedly connected with the first sun gear;
    a third single-row planetary gear train including a third sun gear, a third planetary gear, a third planet carrier and a third gear ring, wherein the third sun gear is fixedly connected with the differential housing, and the third gear ring is fixedly connected with the second planet carrier;
    a first clutch respectively connected with the first half shaft and the first planet carrier for separating or engaging the first half shaft and the first planet carrier; and
    a third clutch respectively connected with the first half shaft and the third planet carrier, for separating or engaging the first half shaft and the third planet carrier.

2. The dual-motor coupling drive axle with a torque vectoring function according to claim 1, wherein the dual-motor coupling drive axle further comprises:
    a second clutch respectively connected with the first planet carrier and the drive axle housing for separating or engaging the first planet carrier and the drive axle housing; and
    a fourth clutch respectively connected with the third planet carrier and the drive axle housing for separating or engaging the third planet carrier and the drive axle housing.

3. The dual-motor coupling drive axle with a torque vectoring function according to claim 2, wherein the TV control drive mechanism comprises a TV control motor and a TV reducing mechanism;
    the TV control motor includes a hollow output shaft; and the first half shaft is rotatably supported on the hollow output shaft and penetrates out of the hollow output shaft.

4. The dual-motor coupling drive axle with a torque vectoring function according to claim 2, wherein the TV reducing mechanism comprises:
    a fourth single-row planetary gear train including a fourth sun gear, a fourth planetary gear, a fourth planet carrier and a fourth gear ring, wherein the fourth sun gear is fixedly connected with the hollow output shaft, and the fourth gear ring is fixed to the drive axle housing; and
    a fifth single-row planetary gear train including a fifth sun gear, a fifth planetary gear, a fifth planet carrier and a fifth gear ring, wherein the fifth sun gear is fixedly connected with the fourth planet carrier, the fifth gear ring is fixed to the drive axle housing, and the fifth planet carrier is fixedly connected with the first gear ring.

5. The dual-motor coupling drive axle with a torque vectoring function according to claim 1, wherein the main drive mechanism comprises a main drive motor and a main reducing mechanism.

6. The dual-motor coupling drive axle with a torque vectoring function according to claim 5, wherein the main reducing mechanism comprises:
    a seventh single-row planetary gear train including a seventh sun gear, a seventh planetary gear, a seventh planet carrier and a seventh gear ring, wherein the seventh sun gear is fixedly connected with an output shaft of the main drive motor, and the seventh gear ring is fixed to the drive axle housing; and
    a sixth single-row planetary gear train including a sixth sun gear, a sixth planetary gear, a sixth planet carrier and a sixth gear ring, wherein the sixth sun gear is fixedly connected with the seventh planet carrier, the sixth gear ring is fixed to the drive axle housing, and the sixth planet carrier is fixedly connected with the differential housing.

7. The dual-motor coupling drive axle with a torque vectoring function according to claim 6, wherein the main drive motor comprises a hollow output shaft; and a second half shaft is rotatably supported on the hollow output shaft and penetrates out of the hollow output shaft.

8. A dual-motor coupling drive axle with a torque vectoring function, comprising:
    a main drive mechanism arranged on one side of a differential, wherein an output end of the main drive mechanism is connected with a differential housing, so that rotary power is transferred to the differential housing;

a TV control drive mechanism arranged on the other side of the differential;

a first single-row planetary gear train including a first sun gear, a first planetary gear, a first planet carrier and a first gear ring, wherein the first sun gear is rotatably supported on a first half shaft, and the first gear ring is connected with an output end of the TV control drive mechanism;

a second single-row planetary gear train including a second sun gear, a second planetary gear, a second planet carrier and a second gear ring, wherein the second gear ring is fixed to a drive axle housing, and the second sun gear is coaxially and fixedly connected with the first sun gear;

a third two-stage single-row planetary gear train including a third sun gear, a third two-stage planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier;

a second clutch respectively connected with the first planet carrier and the drive axle housing for separating or engaging the first planet carrier and the drive axle housing;

a third clutch respectively connected with the first half shaft and the third planet carrier for separating or engaging the first half shaft and the third planet carrier; and a fourth clutch respectively connected with the third planet carrier and the drive axle housing for separating or engaging the third planet carrier and the drive axle housing.

9. A dual-motor coupling drive axle with a torque vectoring function, comprising:

a main drive mechanism arranged on one side of a differential, wherein an output end of the main drive mechanism is connected with a differential housing, so that rotary power is transferred to the differential housing;

a TV control drive mechanism arranged on the other side of the differential;

a first single-row two-stage planetary gear train including a first sun gear, a first two-stage planetary gear, a first planet carrier and a first gear ring, wherein the first sun gear is rotatably supported on a first half shaft, and the first gear ring is connected with an output end of the TV control drive mechanism;

a second single-row two-stage planetary gear train including a second sun gear, a second two-stage planetary gear, a second planet carrier and a second gear ring, wherein the second gear ring is fixed to a drive axle housing, and the second sun gear is coaxially and fixedly connected with the first sun gear;

a third single-row planetary gear train including a third sun gear, a third planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier;

a second clutch respectively connected with the first planet carrier and the drive axle housing for separating or engaging the first planet carrier and the drive axle housing;

a third clutch respectively connected with the first half shaft and the third planet carrier for separating or engaging the first half shaft and the third planet carrier; and a fourth clutch respectively connected with the third planet carrier and the drive axle housing for separating or engaging the third planet carrier and the drive axle housing.

10. A dual-motor coupling drive axle with a torque vectoring function according to claim 1, comprising:

a main drive mechanism arranged on one side of a differential, wherein an output end of the main drive mechanism is connected with a differential housing, so that rotary power is transferred to the differential housing;

a TV control drive mechanism arranged on the other side of the differential;

a first single-row two-stage planetary gear train including a first sun gear, a first two-stage planetary gear, a first planet carrier and a first gear ring, wherein the first sun gear is rotatably supported on a first half shaft, and the first gear ring is connected with an output end of the TV control drive mechanism;

a second single-row two-stage planetary gear train including a second sun gear, a second two-stage planetary gear, a second planet carrier and a second gear ring, wherein the second gear ring is fixed to a drive axle housing, and the second sun gear is coaxially and fixedly connected with the first sun gear;

a third single-row two-stage planetary gear train including a third sun gear, a third two-stage planetary gear, a third planet carrier and a third gear ring, wherein the third sun gear is fixedly connected with the differential housing, and the third gear ring is fixedly connected with the second planet carrier;

a first clutch respectively connected with the first half shaft and the first planet carrier for separating or engaging the first half shaft and the first planet carrier;

a second clutch respectively connected with the first planet carrier and the drive axle housing for separating or engaging the first planet carrier and the drive axle housing;

a third clutch respectively connected with the first half shaft and the third planet carrier for separating or engaging the first half shaft and the third planet carrier; and a fourth clutch respectively connected with the third planet carrier and the drive axle housing for separating or engaging the third planet carrier and the drive axle housing.

* * * * *